March 2, 1954          H. CHRYSTIE          2,671,134
ELECTRIC AND ELECTRONIC INSTRUMENTS AND METHOD OF ASSEMBLY
Filed March 22, 1949          8 Sheets-Sheet 1

INVENTOR.
Henry Chrystie.
BY Nims and Nims
ATTORNEYS.

March 2, 1954

H. CHRYSTIE 2,671,134

ELECTRIC AND ELECTRONIC INSTRUMENTS AND METHOD OF ASSEMBLY

Filed March 22, 1949

8 Sheets-Sheet 2

INVENTOR.
Henry Chrystie
BY Pines and Pines
ATTORNEYS.

INVENTOR.
Henry Chrystie
BY Rines and Rines
ATTORNEYS

INVENTOR.
Henry Chrystie.
BY Rines and Rines
ATTORNEYS.

INVENTOR.
Henry Chrystie

INVENTOR.
Henry Chrystie

Patented Mar. 2, 1954

2,671,134

UNITED STATES PATENT OFFICE 2,671,134

ELECTRIC AND ELECTRONIC INSTRUMENTS AND METHOD OF ASSEMBLY

Henry Chrystie, Lexington, Mass., assignor to Hermon Hosmer Scott, Inc., Cambridge, Mass., a corporation of Massachusetts Application March 22, 1949, Serial No. 82,868

13 Claims. (Cl. 179—1)

1

The present invention relates to an electronic apparatus. The invention is of general utility and may be used, for example, in connection with radio receivers, radio telephones, hearing aids, etc. For definiteness, the invention is illustrated and described herein in connection with a sound level meter, but the inventon is equally applicable to other types of apparatuses.

This invention relates further to the mechanical assembly and wiring of electronic and electrical instruments and especially to those units in which small size, portability, and simplicity are of particular importance.

An object of the invention is to reduce the size of electronic apparatus in order to render it more compact and light.

Another object is to simplify the construction of the electronic apparatus.

Another object still, is to reduce the cost of the electronic apparatus.

A further object is to provide a new and improved sound-measuring instrument.

Another object is to provide a simplified type of electronic instrument which can be easily manufactured.

Still another object is to provide new and improved electronic apparatus having an improved performance in operation.

Other and further objects will be explained hereinafter and will be particularly pointed out in the appended claims.

Figure 1:
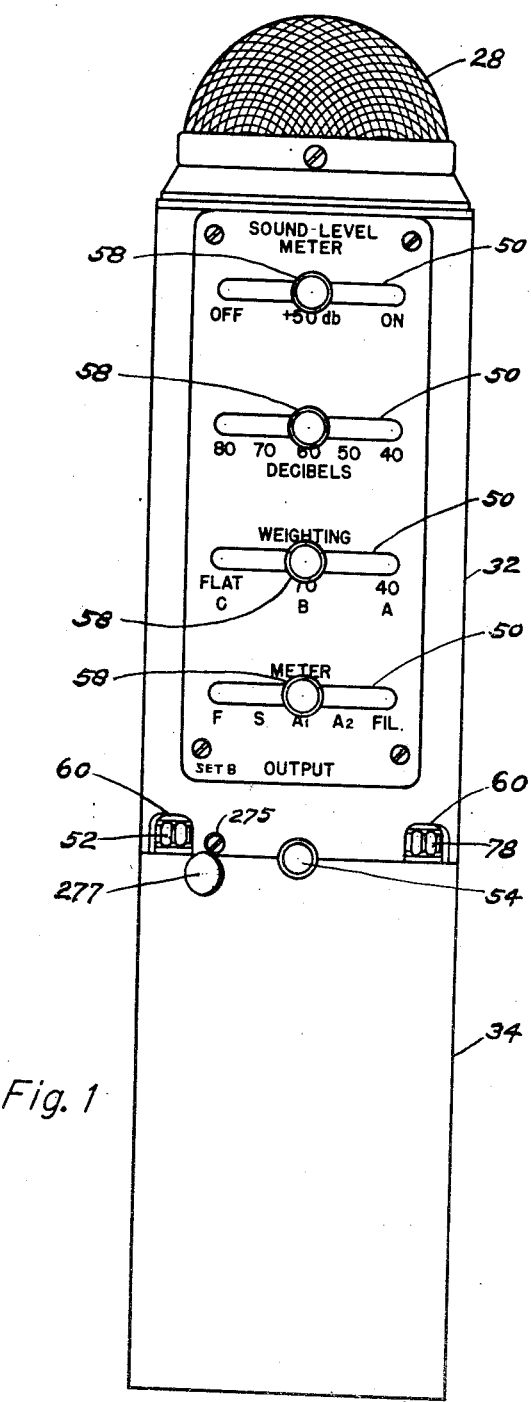
Figure 2:
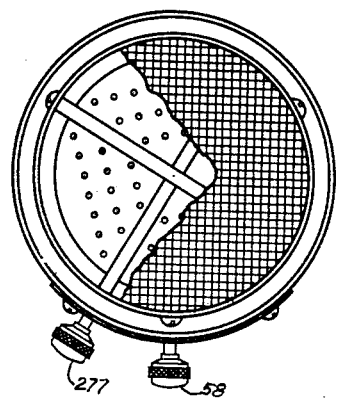
Figure 3:
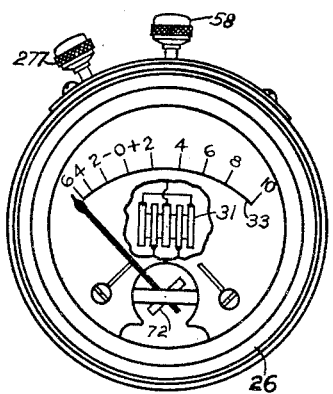
Figure 5:
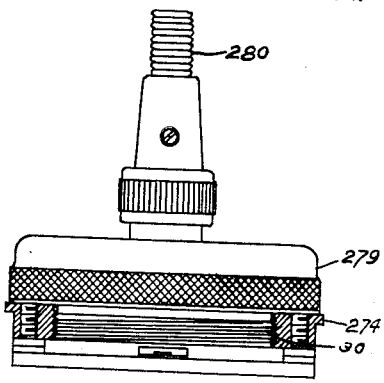
Figure 4:
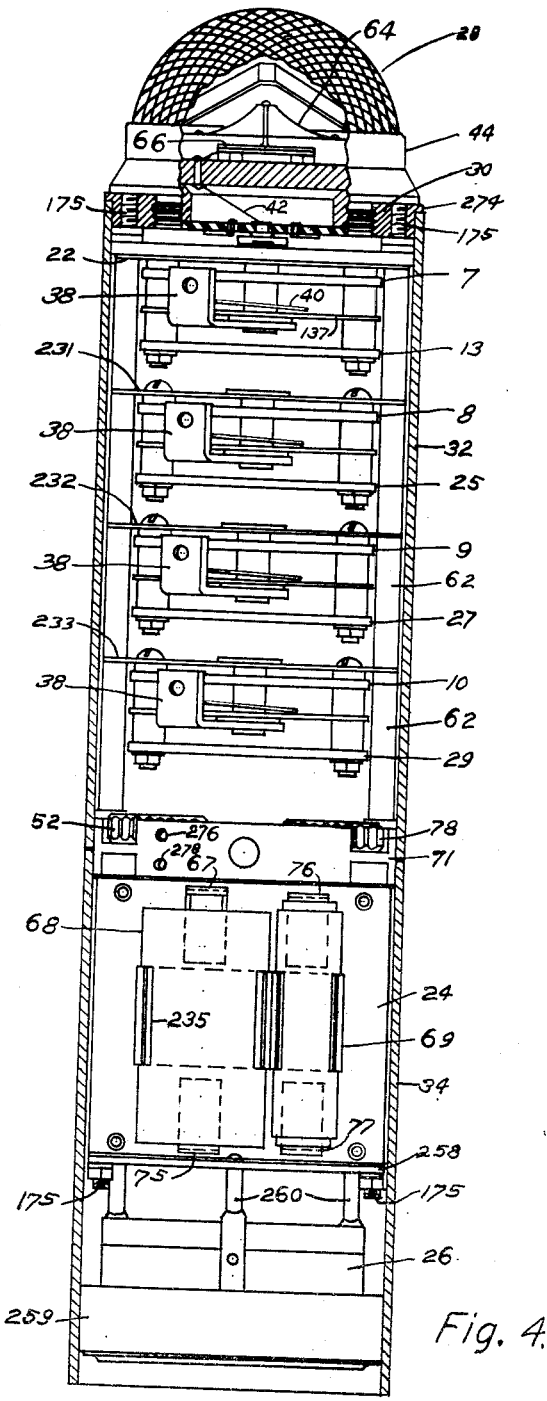
Figure 6:
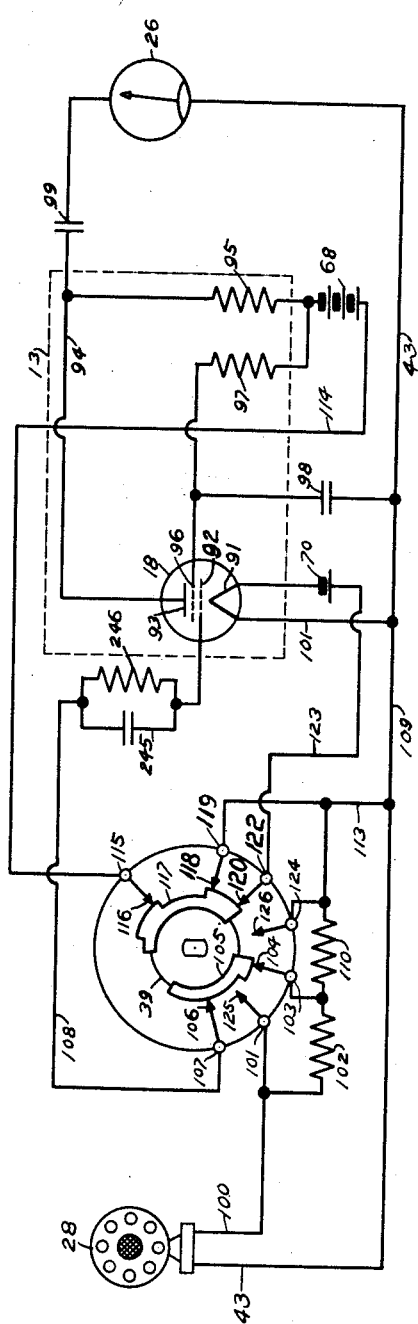
Figure 7:
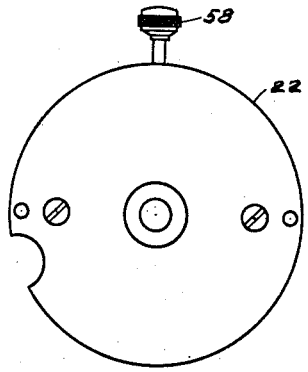
Figure 8:
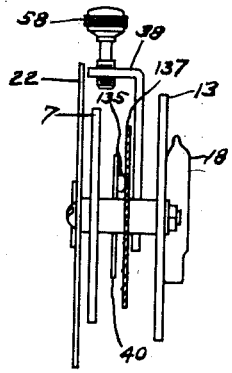
Figure 9:
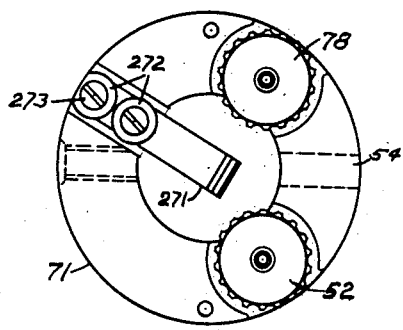
Figure 10:
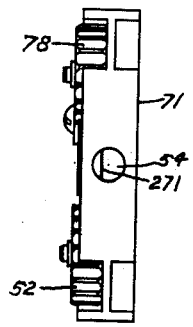
Figure 11:
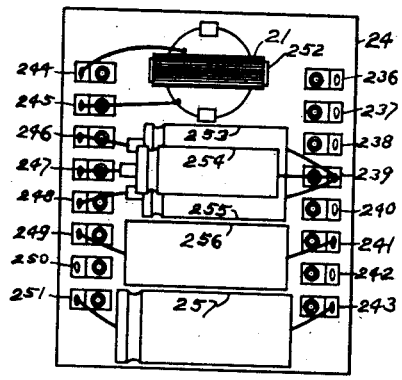
Figure 12:
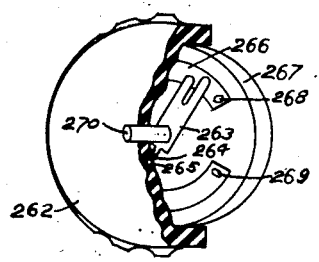

The invention will now be described in connection with the accompanying drawings in which Fig. 1 is an elevation of a sound level meter embodying the present invention; Fig. 2 is a plan of the same partly broken away for clearness; Fig. 3 is an underside plan of the same to show a detail; Fig. 4 is an elevation similar to Fig. 1, with the covers of the instrument removed, partly broken away to show details of construction; Fig. 5 is an elevation partly in longitudinal section showing a cable connecting device that may be substituted for the microphone shown in Figs. 1, 2 and 4; Fig. 6 is a simplified circuit diagram of a sound level meter similar to that shown in Figs. 1 to 4. Fig. 7 is a plan of a subassembly unit embodied in Figs. 1 and 4. Fig. 8 is a side elevation of the unit in Fig. 7; Fig. 9 is a plan of a middle ring of the instrument of Figs. 1 and 4 embodying apparatus for adjusting gain for calibrating, for plugging in external apparatus, and for mounting on a tripod; Fig. 10 is an elevation of the same; Fig. 11 is a rear elevation corresponding to a portion of Fig. 4; Fig. 12 is a perspective partly broken away to show one of

2 the control elements shown in Figs. 9 and 10; and Figs. 13a, 13b, 13c, and 13d are a more complete circuit diagram typical of the instrument shown in Figs. 1 and 4 and showing the connections of the various wafer-circuit assemblies and control assemblies in this electric circuit.

Referring first to the simplified diagrammatic showing of Fig. 6, a sound signal impinging upon the microphone 28 would impress a signal between the cathode 91 and the control electrode 92 of an amplifier tube 18, and this voltage will be amplified in the output circuit of the tube 18 to become recorded in the indicating instrument 26. The indicating instrument 26 may be a moving coil, rectifier-type, vacuum tube voltmeter or any other type of indicating instrument suitable for indicating alternating voltages or currents. By suitably calibrating the indicating instrument 26, it is possible to obtain readings of the level of the sound signals.

Sound level meters, as at present employed, are of considerably greater complication than has been illustrated in the simplified diagram of Fig. 6. It is proposed first to explain the present invention, however, by reference to this simplified diagram.

The input circuit may be traced from the microphone 28 by way of a conductor 100 to a terminal 101, which is the upper end of a voltage divider consisting of resistors 102 and 110. The lower end of the voltage divider returns by leads 113 and 43 to the microphone, thus completing the microphone circuit. The contact member 105 engages either terminal 101 or terminal 103 which is connected by the resistors 102 and 110 in order to vary the sensitivity of this sound level meter by picking up the microphone signal from different steps on the voltage divider. The sliding contact 105 also engages the fixed contact 106 and thus a signal is applied to the grid or control electrode 92 of the vacuum tube 18 through terminal 107, lead 108 and the network comprising resistor 246 and capacitor 245. The input circuit of the vacuum tube 18 further comprises the cathode 91 and the leads 101 and 109 which connect to lead 113 and back to the microphone through lead 43. The signal from the microphone is thus applied to the input circuit of the vacuum tube with a degree of attenuation control by the voltage divider.

The output circuit of the amplifier 18 may be traced from the cathode 91 to the anode 93 by way of a conductor 94 through a resistor 95 and a battery 68 and by way of a conductor 114 to a terminal 115. The terminal 115 is provided with a stationary contact member 116 that is engaged by a movable contact member 117. The movable contact member engages also a stationary contact member 118 of a terminal 119 that is connected by way of a conductor 113 and a conductor 109 to the cathode 91. This switch therefore allows the battery to be turned off with the same control which adjusts the input attenuator so that there will be no current drain when the instrument is not in use, as for instance, current through capacitor 98 and 99 which may be electrolytic capacitors. A screen-grid electrode 96 may be connected to the battery 68 by way of the resistor 97. A condenser 98 may be connected in parallel between the screen-grid electrode 96 and the cathode 91 across the resistor 97 and the battery 68. The indicating instrument 26 is shown connected in parallel with the resistor 95 and the battery 68 in series with the condenser 99.

Resistor 95 may be replaced by coupling inductor or transformer. The indicating instrument 26 may be of any type which will indicate alternating current or voltages.

The cathode 91 is energized from a battery 70 in a circuit extending from one terminal of the battery 70 through the cathode 91 by way of the conductors 101, 104 and 113 to the terminal 119 and the stationary contact member 118. The movable contact member 117 that engaged stationary contact member 118 engages a stationary contact member 120 of a terminal 122. The circuit continues from the stationary contact member 120 by way of a conductor 123 back to the other side of the battery 70.

Figure 13A:
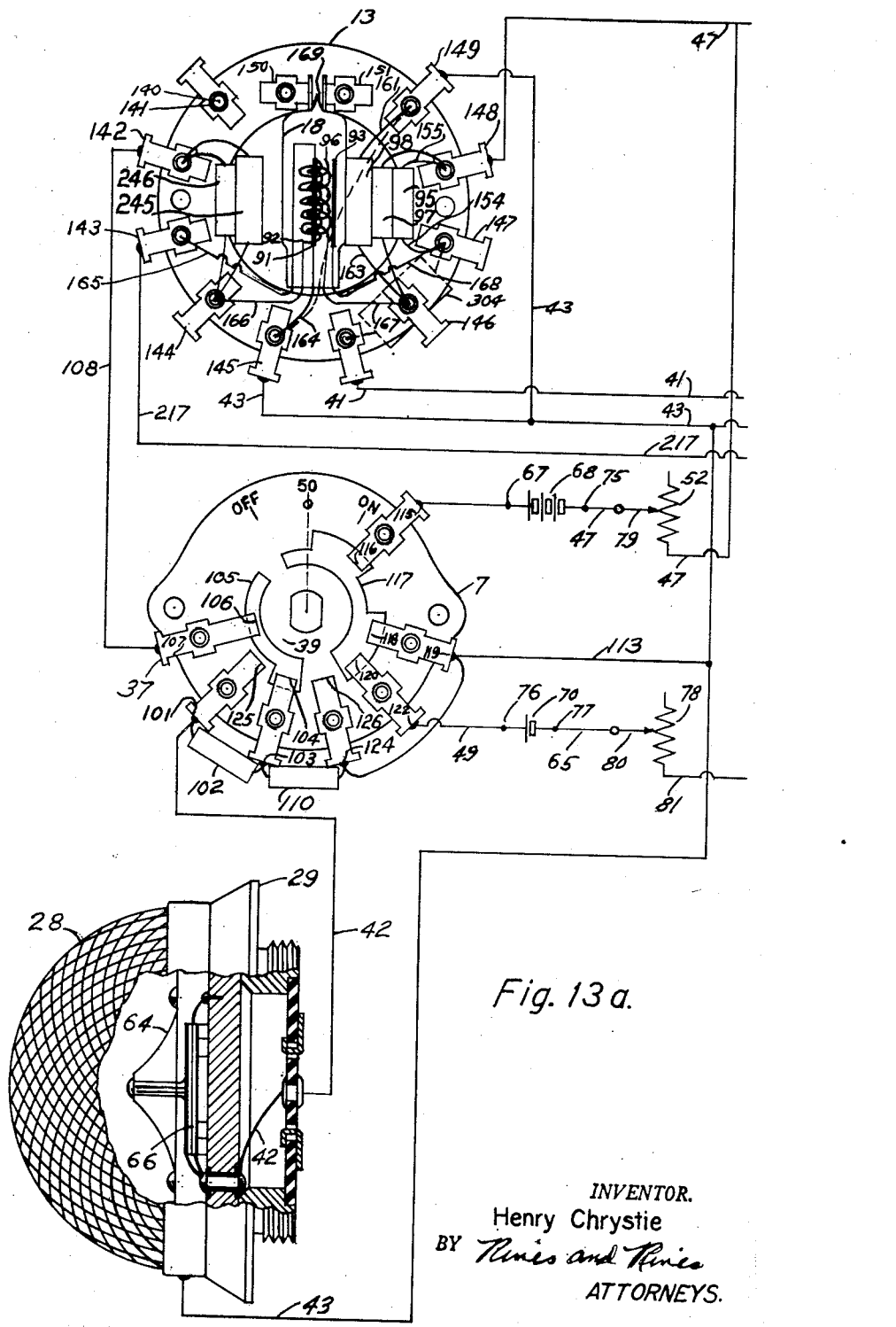
Figure 13B:
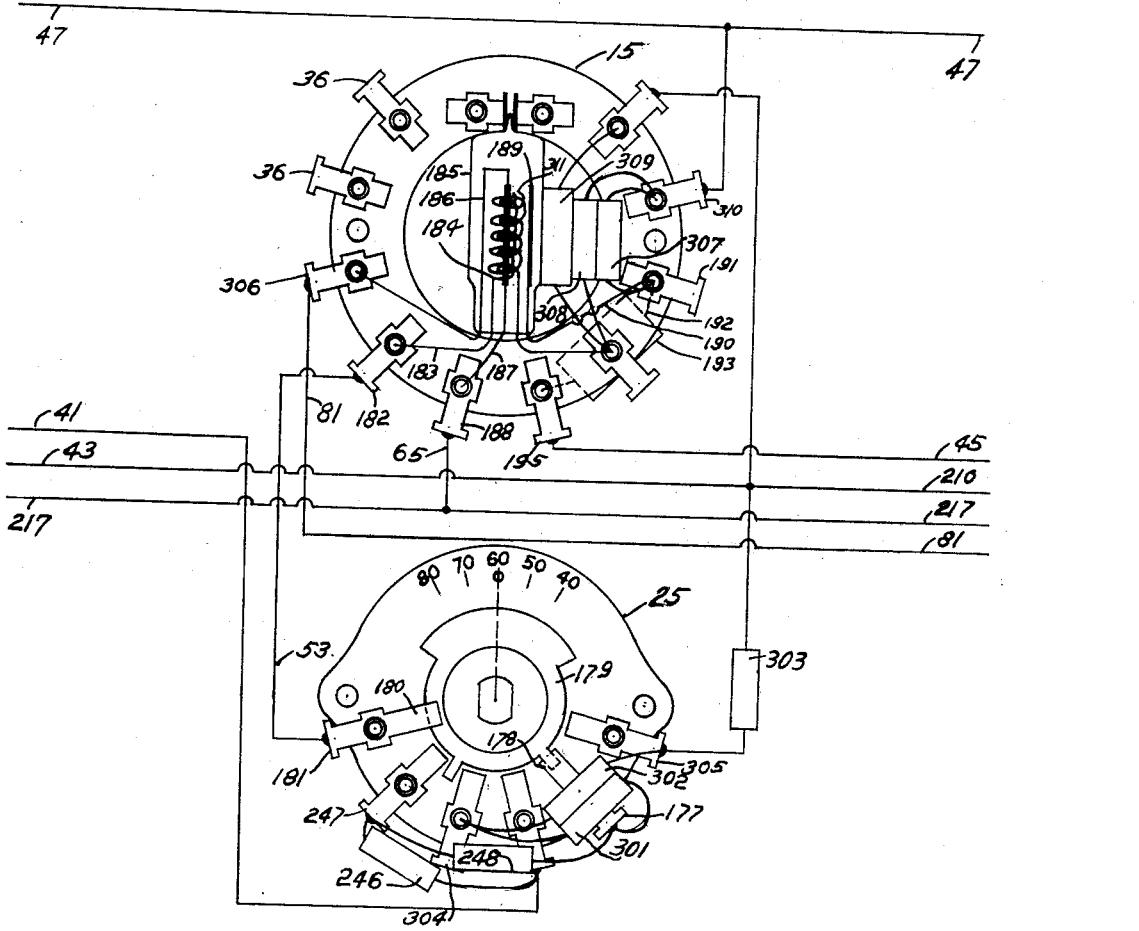
Figure 13C:
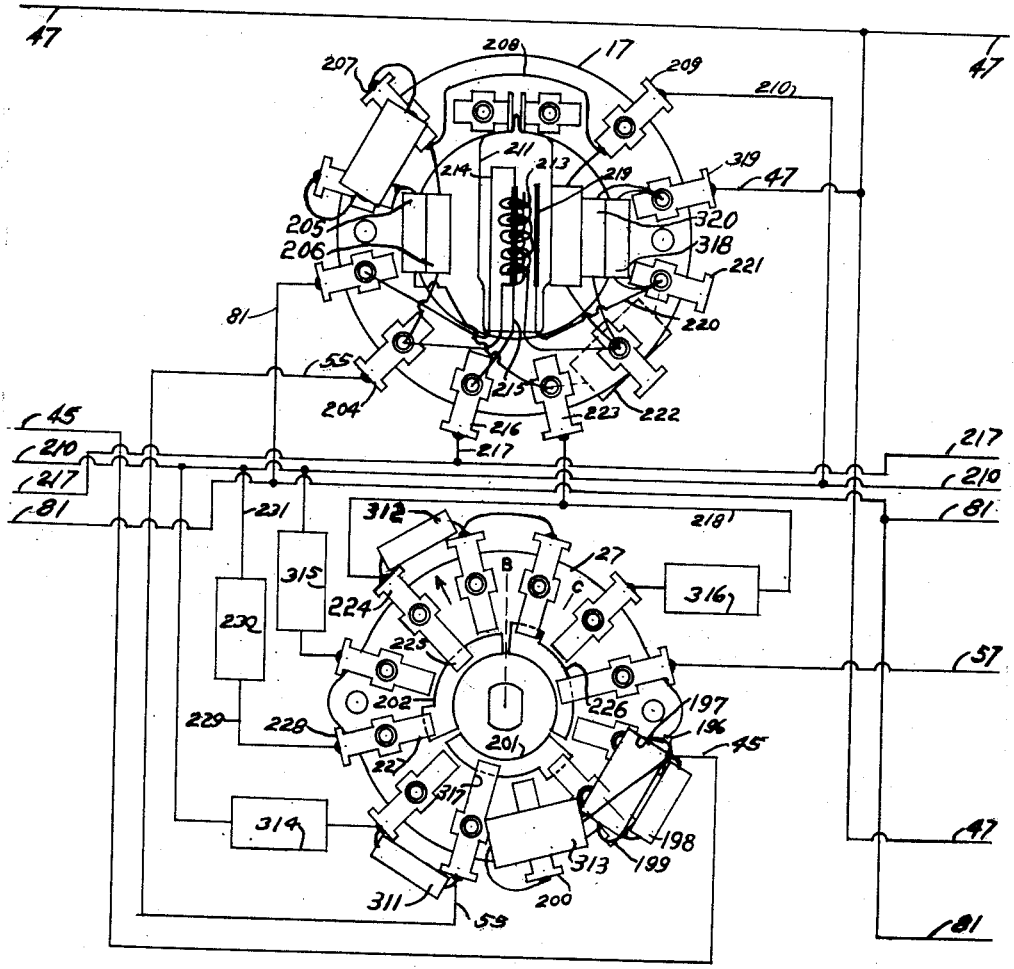
Figure 13D:
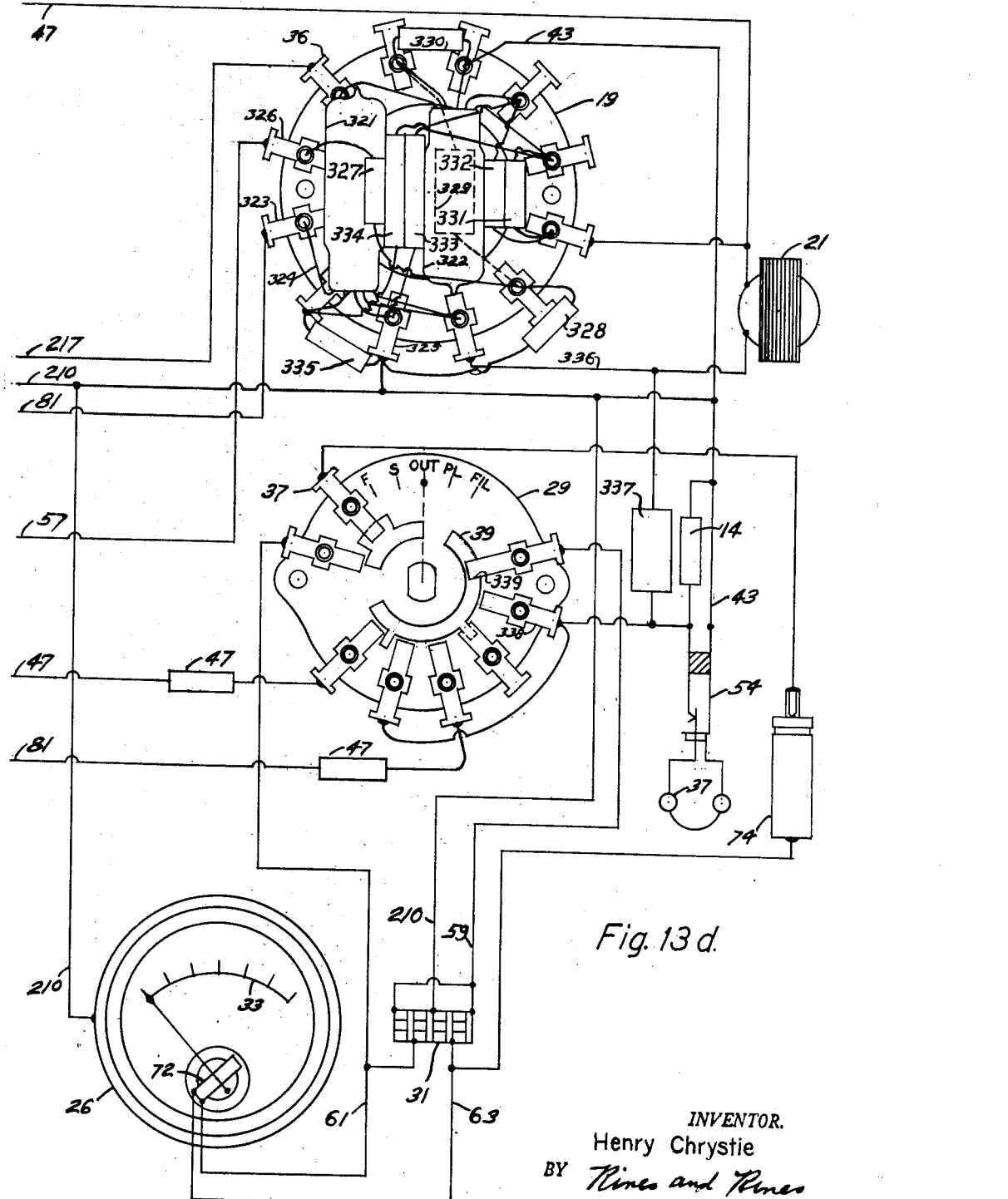

Turning the insulated section 39 of the switch 7 therefore, which is shown more completely in Fig. 13a, by moving the contacts 105 and 117, allows the batteries to be turned off or on and the degrees of sensitivity of the instrument to be adjusted with a single control.

Present day electronic aparatus of the above described character is rather bulky, complicated, and expensive. The vacuum tubes are large; the various lead wires are long. Not only is the equipment, therefore, bulky and expensive, but errors are introduced in the readings.

According to the present invention, however, the instrument is rendered compact and light, the cost is reduced and the accuracy is increased.

It is with this end in view that the various terminals 101, 103, 107, 115, 119, 122, and 124 are mounted compactly upon a small, thin disc wafer 7 of insulating material, together with the adjustable elements 39, 105 and 117. By reason of the fact that the wafer 7 carries terminals that are provided with switch-contact members, movable and stationary, for controlling the circuits of the amplifier 18, the wafer 7 will hereinafter be referred to as the control wafer of the amplifier 18.

Another wafer 13 is also provided which may be termed the circuit-assembly wafer of the amplifier 18. Both wafers, 7 and 13, are substantially circular and substantially of the same diameter. They are disposed on the instrument substantially parallel to each other, concentrically arranged, as shown in Fig. 8.

The insulating disc wafer 13, like the insulating disc wafer 7, is provided with a plurality of circumferentially disposed openings 140 for receiving eyelets 141 in order to secure on the disc wafer 13 a number of additional terminals 142, 143, 144, 145, 146, 147, 148, 149, 150, and 151 as shown in Fig. 13a. More or less than this number of terminals may be mounted upon the disc wafer 13 depending upon the requirements of the circuit.

The insulating wafer 13 is shown carrying the resistors 95, 97, and 246 and also the condensers 98 and 245. The resistor 95 is provided with conductors 154 and 155 that are connected to the terminal 147 and 148, respectively in order to support the resistor 95. The resistor 97 is similarly provided with conductors that are respectively connected to the terminals 146 and 149. The terminals 146 and 148, therefore, support the resistor 97. The resistor 246 is provided with conductors that are respectively secured to the terminals 144 and 142 for support thereby. The condenser 98 is provided with conductors 160 and 161 that are respectively connected to the terminals 145 and 149 in order to support the condenser 98. The condenser 245 is similarly provided with conductors that are respectively connected to the terminals 144 and 142 for support.

Fig. 7 shows a subassembly mounted upon a shield disc 22 indicating how the knob 58 which forms the end of the lever arm projects beyond the assembly. Fig. 8 is a side elevation of Fig. 7 showing a typical method of mounting a switch wafer 7 and a circuit wafer 13. This assembly of Figs. 7 and 8 is typical of the plurality of such assemblies shown in Fig. 4 as for instance those mounted on shield discs 231, 232, 233 as well as 22.

The electron discharge device or vacuum tube, 18, is mounted with its long axis substantially parallel to the circular wafer or mounting plate 13 in order to provide maximum compactness in the final assembly.

Referring to Fig. 8, provision is made for accentuating the position of the rotatable adjustment of the wafer 7. To this end a disc 40 is provided. The disc 40 may be constituted of spring metal from which is struck a tongue 135 that is adapted to ride over holes in a plate 137 that is stationary during the rotatable adjustment of the switch lever 38. The tongue 135 engages within adjacently disposed holes in plate 137 in order to accentuate the position of the rotatable adjustment lever 38.

It can be seen from the above and by referring to Fig. 8 that here is a basic unit or stage consisting of a circuit assembly wafer 13 containing an amplifier and associated resistors and condensers, a control wafer 7 containing suitable switching or other adjustments, a mechanism 40, 135, 137, 39, 58 etc., for operating the control device, and a shield 22. This basic unit may be used individually or many may be used stacked one against the other together with batteries or other power source and a suitable pickup device, such as the microphone 28 and a suitable indicating device, such as the indicating instrument 26.

It is in this manner that the sound level meter shown in Fig. 1 and Fig. 4 consists of four such basic units or stages together with batteries and their supporting devices and other associated components mounted on an insulated base 24 (of which Fig. 11 is a rear view), by means of rods 175, and together with a microphone 28 and an indicating instrument 26.

Fig. 11 shows a terminal board mounted directly behind and back-to-back with the insulated base 24.

As is clear from Fig. 4, the four subassembly similar to Figs. 7 and 8 are similarly mounted on the base 24 and rods 175. These units are of a nature somewhat similar to the unit already described. Each comprises two insulating discs, one carrying the assembly of circuit elements for a separate vacuum-tube amplifier, and the other, a plurality of stationary and movable contact members for controlling the circuits of the corresponding vacuum tube amplifier, as well as a shield, detent device, etc. These circuits are connected in cascade. The first amplifier circuit of the cascade, as already explained, has an input circuit to which the microphone 28 is connected, and an output circuit. This output circuit is connected to the input circuit of the next amplifier circuit, where additional adjustments in sensitivity of the instrument may be made. The output circuit of this next amplifier circuit is connected through adjustable networks which can be used to alter the operating characteristics of the instrument, then to the input circuit of the next following amplifier circuit, etc. The indicating instrument 26 is connected in the output circuit of the last amplifier of the cascade. This four stage sound level meter is described more fully in the following paragraphs.

Referring now to Fig. 13a, which is the same as Fig. 6, except for that part of the circuit which connects the indicating instrument, it has been stated that the amplifier 18 is provided with a cathode 91, a control-grid electrode 92, a screen-grid electrode 96, and an anode 93. The cathode 91 is provided with conductors 164 and 165 that are respectively secured to the terminals 145 and 143. The control-grid electrode 92 is provided with a conductor 166 that is secured to the terminal 144. The screen-grid electrode 96 is provided with a conductor 167 that is secured to the terminal 146. The anode 93 is provided with a conductor 168 that is secured to the terminal 147. The envelope of the amplifier 18 is provided with an attached projecting portion 169 that is held between the terminals 150 and 151. Through the medium of the conductors connected to the cathode 91, the control-grid electrode 92, the screen-grid electrode 96, and the anode 93, and through the medium of the attached projecting portion 169, the amplifier tube 18 is held in place on the insulating wafer 13.

The amplifier 18 is thus provided with an input circuit and an output circuit into which are connected circuit elements that are mounted on the insulating wafer 13, together with the amplifer 18, and these circuits are under the control of control contact members mounted upon the insulating member 7. A very compact unit or sub-assembly is thus provided, small in size, light in weight, inexpensive to manufacture, providing this amplifier and its circuits. In a practical embodiment of this invention the insulating wafers are less than two inches in diameter, and they are spaced apart about ¼ of an inch.

The circuit elements have been described as mounted upon the insulating wafer 13 by means of wires connected thereto. It is not essential, however, to mount the circuit elements in this way. The circuit elements may, for example, be mounted on the insulating wafer 13 by means of printing methods well known in the art. The manufacture of the movable contact members, however, are not adapted to printing. Each stationary contact member is shown as provided with two prong wipers 171 between which the movable contact member rides while the prongs press against it by the inherent resiliency. A construction of this kind is not adapted to manufacture by printing methods.

Since the sound level meter consists of four units or sub-assemblies, and the circuit of the first one has already been described with reference to Fig. 6 and Fig. 13a, the circuit may be traced from the output of Fig. 13a through Figs. 13b, 13c, and 13d as fellows.

The output circuit of the first amplifier is coupled through condenser 304 and conductor 41 to a voltage divider similar to that in the first amplifier. This voltage divider consists of resistors 246, 248, 301, 302, and 303. The lower end of resistor 303 returns by way of conductor 43 to the output circuit of the first amplifier 18, thereby completing this output circuit. The resistors comprising this voltage divider are mounted to terminals 247, 177, 304 and 305, which are a part of switch wafer 25.

Sliding contact 179 engages the fixed contact 178 which is a part of the terminal 177. The sliding contact 179 also engages fixed contact 180 so that signal from the voltage divider is connected by way of terminal 181 and conductor 53 to terminal 182 on assembly wafer 15. Terminal wafer 15 has mounted on it vacuum tube 185 in the same manner that vacuum tube 18 is mounted to terminal wafer 13. The conductor from the grid of vacuum tube 185 is connected to terminal 182, thereby applying the signal from the voltage divider to the aforementioned grid. The cathode of vacuum tube 185 is connected by conductor 183 through terminal 306 and through conductor 81 to the cathode of vacuum tube 211 by way of conductor 214 within the tube. The other side of the cathode of vacuum tube 211 is connected by way of conductor 215 and terminal 216 and conductor 217 to terminal 143, on the terminal wafer 13. It has previously been described that the cathode circuit of tube 18 is connected between terminal 143 and terminal 145 which is attached to conductor 43. It has also previously been described that the voltage divider on wafer 25 is connected by resistor 303 to conductor 43. Therefore, this completes the input circuit of amplifier 185.

The voltage divider assembled to wafer 25 may be adjusted in the same way as the voltage divider assembled to wafer 27, except that this second voltage divider has a finer degree of adjustment, therefore supplements the adjustment obtained with the first voltage divider. The two voltage dividers, besides providing a greater degree of adjustment, allow a much greater range of adjustment than could otherwise be had.

The output circuit of the amplifier 185 may be traced from the anode 189 by way of conductor 190 to terminal 191 and through resistor 307 to terminal 310 and to conductor 47. The circuit continues from conductor 47 through rheostat 52 and through battery 68 to switch wafer 7. The circuit from battery 68 through switch wafer 7 to conductor 43 has previously been described, as has also the circuit from the anode of vacuum tube 185. This completes the output circuit of this tube. A screen-grid electrode 311 is connected to the battery 68 by way of resistor 308, and is connected to the cathode lead 187 by way of conductor 43 through the cathode of vacuum tube 18.

The third unit of this instrument contains an amplifier wafer assembly 17 and a switched weighting network assembly. The purpose of this weighting network is to alter the frequency response characteristic of the instrument so that these response characteristics resemble those of the average human ear at various sensitivity levels. In order to obtain the desired result the network must be divided into three sections, two of which are in the input circuit of the third amplifier and the third is in the output circuit of this amplifier. This weighting network consists of resistors 198, 311 and 312 and condensers 230, 313, 314, 315 and 316, mounted upon switch wafer 27 by means of the conductors which form a part of these resistors and condensers, in the same way that the resistors and condensers are mounted, as previously described, on wafers 7 and 25. The output circuit of vacuum tube 185 is connected from the anode 189 through conductor 190 and through condenser 193 to terminal 195, where it continues through conductor 45 to the junction of resistor 198 and condenser 197 which are a part of the weighting network. The other conductors of resistor 198 and condenser 197 connect to terminal 199 of switch wafer 27. Terminal 199 is contacted by sliding contact 201 which also contacts terminal 317 and which is connected by conductor 55 to terminal 204 of wafer 17 and hence to the grid of vacuum tube 211 by conductor 212. The cathode of vacuum tube 211 has already been described as being connected by way of lead 217 through vacuum tube 18 to conductor 43. This completes the input circuit of vacuum tube 211.

The output circuit of vacuum tube 211 may be traced from the anode 219 to terminal 221 by way of conductor 220, then through resistor 313 to terminal 319 and to conductor 47. It has been previously described how the path of conductor 47 can be traced through rheostat 52 and battery 68 to switch wafer 7 and to conductor 43. This completes the anode circuit of vacuum tube 211.

The output signal from vacuum tube 211 may be traced from terminal 221 through condenser 222 to terminal 223 and by way of conductor 218 to the weighting network. At the point where condenser 218 attaches to the weighting network, this network divides into two branches, one of which through condenser 316 may be used to couple the signal into the input of the next amplifier 322. If the switch rotor 226 is so adjusted, the other branch of conductor 218 attaches to switch terminal 224, and may by proper adjustment of switch rotors 202 and 226 connect the signal in several ways through to the input of vacuum tube 322, and at the same time may modify the connecting of this signal as previously described. A portion of the signal obtained by way of conductor 218 may be fed through the several switches assembled on wafer 27 back to the input circuit of vacuum tube 211, so as to modify the signal appearing in this input.

The fourth unit for subassembly of this sound level meter contains an amplifier wafer 19 and a switch wafer 29. The amplifier wafer 19 in this unit carries two vacuum tubes, 321 and 322, and this wafer illustrates how more than one vacuum tube or similar device may be attached to such a wafer. The input circuit of vacuum tube 322 may be traced from the weighting network on switch wafer 27 by way of conductor 57 as previously described. The input circuit continues from conductor 57 to terminal 326 and to a voltage divider consisting of resistors 327 and 328, the lower end of resistor being connected to terminal 325, and in turn through condenser 210 and to conductor 43, which completes the circuit of this voltage divider. The junction between resistor 327 and 328, that is the point at which reduced voltage is obtained from this divider, is connected to the grid of vacuum tube 322 by way of condenser 329. The bias on this grid is obtained by way of resistor 330 which is connected to condenser 43, as is also the anode of vacuum tube 322. This completes the input circuit of vacuum tube 322.

The output circuit of vacuum tube 322 may be traced through resistor 331 to conductor 47 which has previously been described as returning through the rheostat and battery to the cathode circuit, thereby completing this output circuit.

Vacuum tube 322 may contain a screen grid electrode which may be connected to the battery through resistor 332, and which may be connected to the cathode circuit by way of condenser 333, as has previously been described in connection with the other vacuum tubes in this instrument. The output voltage from vacuum tube 322 is connected by way of condenser 334 to the grid of vacuum tube 321. The grid of this tube is connected by resistor 335 to the cathode circuit of this tube, thereby providing proper bias. The output circuit of vacuum tube 321 is connected by way of conductor 336 to choke coil 21, which is in turn connected to conductor 47, thereby completing the output circuit. Choke coil 21 is a small magnetic core inductance which in this instrument is attached to terminal board 24, as illustrated in Figure 11. This inductance could, if desired, be attached to terminal wafer 19.

One of the purposes of the switch wafer 29 is to alter the damping of indicating instrument 26, by connecting the condenser 74 across the moving coil 72. Another function of switch wafer 29 is to connect the moving coil 72 of the indicating instrument 26 in such a way that it will test and measure the voltage obtained from the various batteries 68 and 70, and still another function of this switch wafer is to connect the signal obtained from the output circuit of vacuum tube 321 to the jack 54, so that this output signal may be used in conjunction with other apparatus not normally a part of this instrument.

The signal from the output circuit of vacuum tube 321 may be traced from condenser 336 through condenser 337 to switch wafer terminal 338 and through sliding contact No. 39 to fixed contact No. 339 and by way of conductor 59 to rectifier 31. The purpose of rectifier 31 is to convert the alternating current signal obtained from the output circuit of vacuum tube 321, so that it may be applied to the moving coil 72 of the indicating instrument 26. This is done through conductors 61 and 63. The other side of the input circuit to rectifier 31 is connected by condenser 210 to condenser 43, thereby completing this circuit.

The insulating plate 24 on one side carries the batteries 68 and 70. The insulating plate 24 is assembled to the rods 175 by means of clips 234. Battery 68 is held in place by a clipping device 235 and connects to terminal clips 67 and 75. Battery 70 is held in place by a clipping device 69 and is connected to terminal clips 76 and 77.

The other side of the insulating plate 24 carries terminal clips 236 to 251 inclusive and is illustrated in Fig. 11. A choke coil 21 is attached to a plate 24 by means of a clip 252. The connecting leads of the choke coil 21 are attached to terminals 244 and 245. A condenser 253 is connected to and supported by the terminals 239 and 246. Condenser 254 is connected to and supported by terminals 239 and 247. Condenser 255 is connected to and supported by 239 and 248. Likewise, condenser 256 is connected to and supported by the terminals 241 and 249, and condenser 257 is connected to and supported by the terminals 243 and 251.

The insulating plate 24 and the batteries and other circuit elements mounted thereon are disposed between the middle ring 71 and a shield 258, and surrounded by the metal cover 34, which serves both as a shield and as part of the case. The various shields 22, 231, 232, 233, are held spaced apart by spacers 62.

Below the insulating plate 24, the instrument carries the indicating instrument 26. The face of the indicating meter is observable through the lower end of the instrument. This is clearly shown in Fig. 3 which is an underside view of Fig. 1. The method of mounting the meter is shown in Fig. 4. This microphone is clearly shown in Figs. 1, 2 and 4, Fig. 1 being a front elevation of the instrument and Fig. 2 being a plan of the instrument showing the protective covering of the microphone cut away to show the microphone mechanism. The microphone in Fig. 4 is depicted similar to Fig. 1 except a portion of the microphone has been cut away, to show further a typical interior construction including the diaphragm 64 which actuates a piezo-electric crystal 66. The instrument is provided with a microphone 28 at one end and the indicating instrument 26 at the other end. Around the indicating instrument 26 there is disposed a ring 259 to insure proper fit in the outer case 34. The ring 259 and the indicating instrument 26 are suspended from the shield 258 by struts 260.

Fig. 9 shows a plain view of the middle ring or base 71 and Fig. 10 a side elevation of the same. The assembly of this base in a complete instrument is shown typically in Fig. 4 where it is also designated by the numerals 71.

The middle ring 71 serves not only to shield the assembly of control wafers from the batteries and other elements mounted upon the insulating plate 24, but also to carry the calibration controls 52 and 78. Fig. 12 is a cut-away section showing the construction of one of these controls in which 262 is a rotatable cover to which is keyed arms 263 by means of pin 264 and slot 265. This results in arm 263 being driven by cover 262. Arm 263 makes contact with the resistance element 266 which is molded into base 267 and which is attached between terminals 268 and 269. The arm 263 also makes contact with shaft 270.

The middle ring 71 carries also a phone jack or a connecting device consisting of hole 54, spring 271, insulators 272, and mounting screws 273. Through this device the impulses that energize the indicating instrument 26 may be applied to various other indicating devices not normally a part of this instrument.

The assembly is contained within a casing consisting of two aligned cover members 32 and 34. The cylindrical cover member 32 extends from the microphone mounting ring 274 to half way down on the middle ring 71 and held in place by a screw 275 extending through the wall of the cylindrical casing 32 into screw-threaded opening 276 of the middle ring 71.

The cylindrical casing member 34 contacts with the lower end of the cylindrical casing 32, and its lower end projects slightly below the meter 26 in order that when the instrument is placed upon a table, the indicating instrument 26 shall be arranged slightly above the table, so as to prevent breakage or damage to the indicating instrument. The cylindrical casing member 34 is held in place by means of a knob 277 extending through the casing 34 into a screw-threaded opening 278. The batteries 68 and 70 may be replaced by removing this knob 277 and sliding casing member 34 off over the indicating instrument. As before stated, the ring 259 holds the cylindrical casing 34 properly spaced from the indicating instrument body.

The cylindrical casing member 32 is provided with openings 60, through which a thumb may be introduced to turn the controls 52 and 78, thereby adjusting the sensitivity of the instrument.

The cylindrical casing member 32 is provided with a number of horizontal openings 56, through which extend knobs 58 threaded into the switch arms 38. These knobs 58, therefore, extend the operating levers 38 to provide effective operating levers projecting radially or substantially radially from the assembly, the operation is facilitated by the method of mounting the wafers substantially perpendicular to the long axis of the instrument and parallel to the main plane of the meter. It is thus possible to adjust the switch arms radially from outside the instrument. The openings 56 are calibrated as shown in Fig. 1 in order that the operator may be able to determine the degree of rotatable adjustment.

In order to obtain access to the interior of the instrument, it is necessary to unscrew the knobs 58 from their switch arms 38, then to unscrew the knob 277 and screw 275, after which the casing members 34 and 32 may be slipped down off the instrument. The casing members 34 and 32 provide a conveniently sized and shaped package which may with ease be held in the hand while the instrument is being used.

It is sometimes desirable to replace the microphone 22 by some other source of signal. Without removing the cylindrical casing members 32 and 34, it is possible to unscrew the casing 44 of the microphone 28. This exposes threads of a collar that is held to the instrument by the rods 175, the upper ends of which are screwed into the collar as shown in Fig. 4. It is now possible to screw into these threads 30 an adaptor unit 279, to which may be secured a cable 280 leading to some of the sources of signals.

A very efficient, compact, light, inexpensive instrument is thus provided, capable of easy adjustment while held in one hand and requiring only that the observer read the indications of the indicating instrument 26.

Not only is this device light and compact, but it is also inherently more accurate than prior art devices for the reasons among others, that the units connecting the circuit elements to the terminals are quite short, and the wires connecting between the various wafers, 7, 8, 9, 10, 13, 25, 27, etc. are also short. The components may be mounted on the various wafers as tangents, chords, radii, etc. or in any way that provides the shortest and most direct path and may be interconnected or mounted from wafer to wafer for the same reasons. Short direct lead wires result in better performance and smaller size at lower cost.

The levers 38 and knobs 58 project radially in this device but may project axially or in various other ways.

It has already been explained that, though the invention is described herein in connection with a sound level meter, it is of wide applicability.

Modifications will occur to persons skilled in the art and all such are considered to follow within the spirit and scope of the invention as defined in the appended claims.

What is claimed is:

1. A structure for housing an electric apparatus having an input circuit and an output circuit, said structure comprising a tubular casing having sides provided with a plurality of circumferential slots, means mounted at one end of said casing for connecting to said input circuit, means mounted at the other end of said casing for connecting to said output circuit, and means for controlling said electric apparatus from outside of said casing, said controlling means comprising a plurality of control levers projecting radially through said circumferential slots and rotating around axes substantially parallel with said sides.

2. A structure for housing an electric apparatus having an input circuit and an output circuit, said structure comprising a tubular casing having sides provided with a plurality of circumferential slots, means mounted at one end of said casing for connecting to said input circuit, means mounted at the other end of said casing for connecting to said output circuit, said electric apparatus comprising a plurality of wafer-shaped sub-assemblies mounted substantially perpendicular to said sides, a plurality of said wafer-shaped sub-assemblies comprising controllable elements controllable by rotation around axes substantially parallel with said sides and means for rotating said controllable elements from outside of said casing, said rotating means comprising a plurality of control levers projecting radially through said circumferential slots.

3. A structure for housing an electric apparatus having an input circuit and an output circuit, said structure comprising a tubular casing having sides provided with a plurality of circumferential slots, means mounted at one end of said casing for connecting to said input circuit, means mounted at the other end of said casing for connecting to said output circuit, said electric apparatus comprising a plurality of wafer-shaped sub-assemblies and at least one wafer-shaped conductive shield mounted substantially perpendicular to said sides, a plurality of said wafer-shaped sub-assemblies comprising controllable elements controllable by rotation around an axis substantially parallel with said sides and means for rotating said controllable elements from outside of said casing, said rotating means comprising a plurality of control levers projecting radially through said circumferential slots.

4. A structure for housing an electric apparatus having an input circuit and an output circuit, said structure comprising a tubular casing having sides provided with a plurality of circumferential slots, means mounted at one end of said casing for connecting to said input circuit, means mounted at the other end of said casing for connecting to said output circuit, said electric apparatus comprising a plurality of wafer-shaped sub-assemblies and at least one wafer-shaped conductive shield mounted substantially perpendicular to said sides, a plurality of said wafer-shaped sub-assemblies comprising controllable elements controllable by rotation around axes substantially parallel with said sides and means for rotating said controllable elements from outside of said casing.

5. A structure for housing an electronic apparatus having an input circuit and an indicating instrument, said structure comprising a tubular casing having sides provided with a circumferential slot, means mounted at one end of said casing for connecting to said input circuit, means at the other end of said casing for mounting said indicating instrument, means for controlling said electronic apparatus from outside of said casing, said control means comprising a control lever projecting radially through said circumferential slot and rotating around an axis substantially parallel with said sides.

6. A structure for housing an electric apparatus having an input circuit and an indicating instrument, said structure comprising a tubular casing having sides provided with a plurality of circumferential slots, means mounted at one end of said casing for connecting to said input circuit, means at the other end of said casing for mounting said indicating instrument, said electric apparatus comprising a plurality of wafer-shaped sub-assemblies and at least one wafer-shaped conductive shield mounted substantially perpendicular to said sides, a plurality of said wafer-shaped sub-assemblies comprising controllable elements controllable by rotation around an axis substantially parallel with said sides and means for rotating said controllable elements from outside of said casing, said rotating means comprising a plurality of control levers projecting radially through said circumferential slots.

7. A structure for housing an electric apparatus having an input circuit and an output circuit, said structure comprising a substantially cylindrical casing having sides provided with a plurality of circumferential slots, means mounted at one end of said casing for connecting to said input circuit, means mounted at the other end of said casing for connecting to said output circuit, said electric apparatus being supported by a plurality of wafer-shaped sub-assemblies mounted substantially perpendicular to said sides, a plurality of said wafer-shaped sub-assemblies comprising controllable elements controllable by rotation around axes substantially parallel with said sides and means for rotating said controllable elements from outside of said casing.

8. A structure for housing an electric apparatus having an input circuit and an indicating instrument, said structure comprising a substantially cylindrical casing having sides provided with a plurality of circumferential slots and having a main axis, means mounted at one end of said casing for connecting to said input circuit, means at the other end of said casing for mounting said indicating instrument, said electric apparatus comprising a plurality of wafer-shaped sub-assemblies mounted substantially perpendicular to said sides, a plurality of said wafer-shaped assemblies comprising controllable elements controllable by rotation around axes substantially parallel with said sides and means for rotating said controllable elements from outside of said casing.

9. A structure for housing sound level meter apparatus having a microphone and an indicating instrument, said structure comprising a tubular casing having sides provided with a plurality of circumferential slots, means at one end of said casing for mounting said microphone, means at the other end of said casing for mounting said indicating instrument, said sound level meter apparatus comprising a plurality of wafer-shaped sub-assemblies and at least one wafer-shaped conductive shield mounted substantially perpendicular to said sides, a plurality of said wafer-shaped assemblies comprising controllable elements controllable by rotation around axes substantially parallel with said sides and means for rotating said controllable elements from outside of said casing, said rotating means comprising a plurality of control levers projecting radially through said circumferential slots.

10. A structure for housing sound level meter apparatus having a microphone and an indicating instrument, said structure comprising a substantially cylindrical casing having sides provided with a plurality of circumferential slots, means at one end of said casing for mounting said microphone, means at the other end of said casing for mounting said indicating instrument, said sound level meter apparatus comprising a plurality of wafer-shaped sub-assemblies and at least one wafer-shaped conductive shield mounted substantially perpendicular to said sides, a plurality of said wafer-shaped assemblies comprising controllable elements controllable by rotation around axes substantially parallel with said sides and means for rotating said controllable elements from outside of said casing.

11. A structure for housing a sound level meter having a microphone and an indicating instrument, said structure comprising a substantially cylindrical casing having sides provided with a plurality of circumferential slots and having a main axis, means at one end of said casing for mounting said indicating instrument, said sound level meter comprising a plurality of wafer-shaped sub-assemblies and at least one wafer-shaped conductive shield mounted substantially perpendicular to said sides, a plurality of said wafer-shaped assemblies comprising controllable elements controllable by rotation concentrically around an axis substantially parallel with said sides and means for rotating said controllable elements from outside of said casing, said means comprising a plurality of control levers projecting radially through said circumferential slots.

12. A structure for housing and supporting an electric apparatus, said structure comprising a plurality of wafer-shaped sub-assemblies stacked to form a substantially cylindrical main assembly, and further comprising a tubular casing surrounding said assembly, a plurality of said sub-assemblies comprising controllable elements, each of said controllable elements being provided with a control lever for operation from outside of the casing.

13. A sound level meter comprising a microphone, an indicating instrument and a plurality of controls all mounted in a casing substantially tubular in shape, said casing having a main axis, sides substantially parallel to said main axis and ends substantially perpendicular to said main axis, means for mounting said microphone in one end of said casing, means for mounting said indicating instrument in said casing and means for mounting said controls to project substantially perpendicularly to a side of said casing.

HENRY CHRYSTIE.

References Cited in the file of this patent
UNITED STATES PATENTS

| Number | Name | Date |
|---|---|---|
| 755,731 | Alexander | Mar. 29, 1904 |
| 1,648,989 | Lamont | Nov. 15, 1927 |
| 1,728,311 | Taylor | Sept. 17, 1929 |
| 2,103,179 | Rennan | Dec. 21, 1937 |
| 2,120,651 | Schellenger | June 14, 1938 |
| 2,322,708 | Burzer | June 22, 1943 |
| 2,328,853 | Sherrad | Sept. 7, 1943 |
| 2,472,021 | Mitchel | May 31, 1949 |
| 2,486,890 | Stanmyre | Nov. 1, 1949 |

OTHER REFERENCES

Service Manual and Schematic Diagrams Motorola Inc., page 69, published Chicago, Ill., Sept. 1948.